United States Patent
von Hayn et al.

(10) Patent No.: US 11,578,772 B2
(45) Date of Patent: Feb. 14, 2023

(54) DRUM BRAKE

(71) Applicant: Continental Teves AG & Co. OHG, Frankfurt (DE)

(72) Inventors: Holger von Hayn, Bad Vilbel (DE); Martin Gädke, Hofheim/Ts. (DE); Ahmed Sefo, Frankfurt (DE); Jens Hoffmann, Darmstadt (DE); Uwe Bach, Niedernhausen (DE); Martin Semsch, Maibach-Butzbach (DE); Adrian Messner, Mainz (DE); Ulrike Meyer, Frankfurt (DE); Martin Kruse, Frankfurt (DE); Wolfgang Ritter, Oberursel/Ts. (DE); Christian Philipp, Neu-Isenburg (DE)

(73) Assignee: Continental Teves AG & Co. OHG, Frankfurt am Main (DE)

(*) Notice: Subject to any disclaimer, the term of this patent is extended or adjusted under 35 U.S.C. 154(b) by 265 days.

(21) Appl. No.: 16/784,565

(22) Filed: Feb. 7, 2020

(65) Prior Publication Data

US 2020/0191218 A1 Jun. 18, 2020

Related U.S. Application Data

(63) Continuation of application No. PCT/EP2018/074368, filed on Sep. 11, 2018.

(30) Foreign Application Priority Data

Sep. 29, 2017 (DE) .................. 10 2017 217 410.2

(51) Int. Cl.
*F16D 65/22* (2006.01)
*F16D 65/04* (2006.01)
*F16D 51/00* (2006.01)

(52) U.S. Cl.
CPC ............ *F16D 65/22* (2013.01); *F16D 65/04* (2013.01); *F16D 2051/001* (2013.01)

(58) Field of Classification Search
CPC ...... F16D 65/10; F16D 65/22; F16D 2127/06; F16D 53/00; F16D 65/12; F16D 69/0416;
(Continued)

(56) References Cited

U.S. PATENT DOCUMENTS 3,668,445 A * 6/1972 Grove .................... F16D 27/02
310/77
4,172,242 A * 10/1979 Myers .................... F16D 51/48
188/138

(Continued)

FOREIGN PATENT DOCUMENTS

CN 2818906 Y 9/2006
CN 1918397 A 2/2007
(Continued)

OTHER PUBLICATIONS

International Search Report and Written Opinion dated Feb. 1, 2019 from corresponding International Patent Application No. PCT/EP2018/074368.

(Continued)

*Primary Examiner* — Robert A. Siconolfi
*Assistant Examiner* — Mahbubur Rashid

(57) ABSTRACT

The abutment of a drum brake is formed from a solid material which deforms under load, wherein measurement devices are provided which detect this deformation. The abutment has two limbs, on which the brake shoes are supported. The changing distance between the two brake shoes under load is determined by detecting the distance between extension rods on the limbs by a measurement device comprising magnets and Hall sensors or AMR sensors.

17 Claims, 2 Drawing Sheets

(58) Field of Classification Search
CPC .... F16D 65/04; F16D 2051/001; F16D 65/08; F16D 51/00; F16D 51/18; F16D 66/00; B60T 13/74
See application file for complete search history.

(56) References Cited

U.S. PATENT DOCUMENTS

| | | | |
|---|---|---|---|
| 4,257,497 | A | 3/1981 | Schroeder |
| 4,850,459 | A | 7/1989 | Johannesen et al. |
| 4,995,480 | A | 2/1991 | Hazelden et al. |
| 5,443,132 | A * | 8/1995 | Arnold ................ B60T 13/741 188/138 |
| 6,176,352 | B1 | 1/2001 | Maron et al. |
| 6,354,411 | B1 | 3/2002 | Asai et al. |
| 7,504,920 | B2 * | 3/2009 | Richeson ............... F16D 51/48 188/161 |
| 7,881,849 | B2 | 2/2011 | Shiraki |
| 2010/0206677 | A1 | 8/2010 | Shiraki |
| 2015/0345580 | A1 | 12/2015 | Jung |
| 2017/0191535 | A1 | 7/2017 | Emmons |

FOREIGN PATENT DOCUMENTS

| | | | | |
|---|---|---|---|---|
| CN | 201093022 | Y | 7/2008 | |
| CN | 101861260 | A | 10/2010 | |
| CN | 203836029 | U | 9/2014 | |
| CN | 104265803 | A | 1/2015 | |
| CN | 105270361 | A | 1/2016 | |
| CN | 205226166 | U | 5/2016 | |
| CN | 205639388 | U | 10/2016 | |
| CN | 106489038 | A | 3/2017 | |
| DE | 68901719 | T2 | 1/1993 | |
| DE | 19640995 | A1 | 4/1998 | |
| DE | 102007043634 | A1 | 3/2008 | |
| DE | 102013224922 | A1 * | 6/2015 | ............ F16D 51/22 |
| DE | 102019207661 | A1 * | 11/2020 | ............ F16D 51/20 |
| EP | 0388040 | A2 | 9/1990 | |
| EP | 0485093 | A1 | 5/1992 | |
| EP | 0811782 | A2 * | 12/1997 | ......... F16D 65/0012 |
| EP | 0988468 | A1 | 3/2000 | |
| EP | 1049884 | B1 * | 7/2003 | ............ F16D 51/20 |
| EP | 2518360 | A1 | 10/2012 | |
| GB | 1448553 | A | 9/1976 | |
| JP | H02266133 | A | 10/1990 | |
| JP | 2002067914 | A | 3/2002 | |
| JP | 2010276047 | A | 12/2010 | |
| KR | 20040082057 | A | 9/2004 | |
| KR | 100682526 | B1 | 2/2007 | |
| WO | WO-9937935 | A1 * | 7/1999 | ............ F16D 65/09 |
| WO | 9953214 | A1 | 10/1999 | |
| WO | WO-2009044908 | A2 * | 4/2009 | ........... B60T 13/746 |
| WO | WO-2010034541 | A1 * | 4/2010 | ........... G01L 3/1478 |

OTHER PUBLICATIONS

Office Action dated Oct. 25, 2021 from corresponding Chinese patent application No. 201880060149.5.
Chinese Notice of Allowance and Supplementary search dated Jul. 29, 2022 for the counterpart Chinese Patent Application No. 20180060149.5.

* cited by examiner

DRUM BRAKE

CROSS REFERENCE TO RELATED APPLICATIONS

This application is the U.S. national phase application of PCT International Application No. PCT/EP2018/074368, filed Sep. 11, 2018, which claims priority to German Patent Application No. 10 2017 217 410.2, filed Sep. 29, 2017, wherein the contents of such applications are incorporation herein by reference.

TECHNICAL FIELD

A drum brake with a brake drum and two brake shoes which can be applied to the brake drum and are attached on the brake shoe side of a carrier plate.

TECHNICAL BACKGROUND

An electrically actuatable drum brake of this type, in which the spreader device consists of an electric actuator, is described in WO 99/53214.

In order to be able to control or regulate the actuator on brake application, information on the amount of force acting in the drum brake is required. According to WO 99/53214, a load sensor is arranged on an end face of the abutment and measures the force with which one of the brake shoes rests on the abutment.

This information is not however sufficiently precise for controlling or regulating the electric actuator since, on brake application, the friction forces acting on the brake shoes may differ, so that the support forces influenced by the friction forces may also differ for each brake shoe. This support force of a brake shoe therefore does not reflect precisely the total amount of the forces and brake moments acting in the drum brake.

What is needed is a drum brake with a load measuring device at the abutment which reflects the total amount of forces acting in the drum brake on brake application.

DETAILED DESCRIPTION

Figure 1:
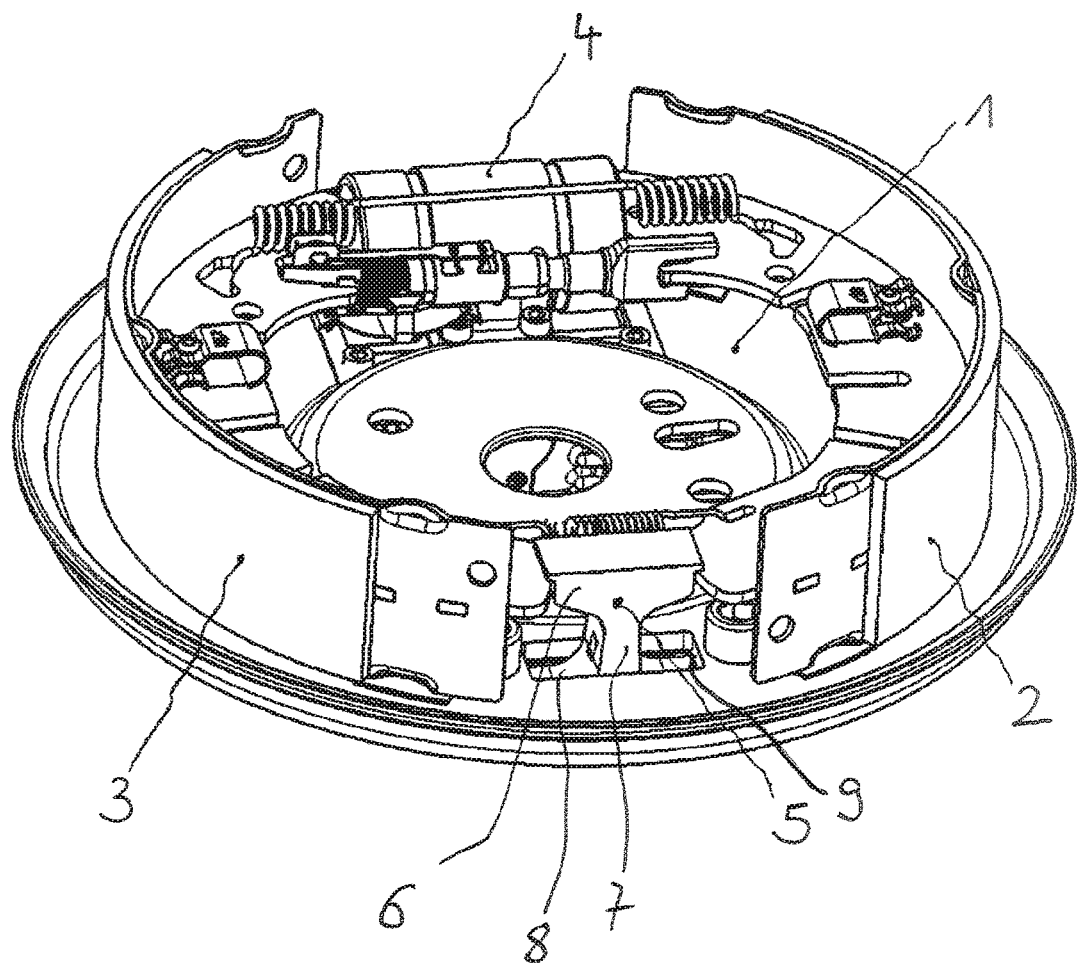
FIG. 1 a brake drum with a first embodiment of the abutment.

In one or more embodiments, a brake drum includes an abutment, where the abutment as a whole is configured as a solid component which can yield elastically under load, and that one or more sensors are provided which detect the deformation of the abutment occurring under load.

Since the deformation of the abutment is determined by the support forces acting on both sides, determining the deformation, e.g. due to the mechanical stresses occurring in the abutment, means that a value is obtained for the forces acting in the brake, and this value is suitable for controlling the actuator.

The deformation can also be detected such that the brake moments of the individual brake shoes can also in each case be detected and determined.

In a first simple design, the abutment is configured in the form of an anvil, wherein the abutment ends lie at opposite ends of the anvil head.

When forces are exerted on the anvil head during braking, mechanical stresses are built up in the head and transferred to its pedestal.

These mechanical stresses can be detected by strain gauges at the anvil. In this embodiment, the deformation of the abutment is thus determined indirectly via mechanical stresses in the abutment.

In another embodiment, the abutment has a U-shape with a base and two limbs, the outsides of which support the abutment ends of the brake shoes, wherein the sensor or sensors are of a type which can detect the slope of the limbs which changes under load.

For this, in some cases strain gauges may be provided on the limbs. Another possibility is that the sensor or sensors detect the distance between the free ends of the limbs.

This may be take place for example using Hall sensors or AMR sensors based on the anisotropic magneto-resistive effect, for which the limbs are provided with magnets which function as signal emitters for the Hall sensor or AMR sensor.

In one or more embodiments, the free ends of the limbs can have inwardly oriented protrusions, the end faces of which are separated from each other by a measurement gap, the width of which can be detected by means of a current-carrying moving coil arranged around the ends of the two protrusions, since the inductance of the moving coil depends on the width of the measurement gap.

In the arrangement described above, the base of the abutment is attached to the outside of the carrier plate, wherein the limbs protrude through an opening in the carrier plate on the brake shoe side where the abutment ends are supported.

In one or more embodiments, the ends of the limbs are supported such that the effects of the supporting forces on the measurement gap are maximal.

In a further embodiment, the abutment is carried by a post attached to the carrier plate and adjoining the inside of the base so that the limbs are oriented towards the carrier plate.

The post is optionally configured integrally with the abutment.

In order to multiply the deformation by the introduced forces, it is provided that the limbs have extensions.

In order for the measuring device to be arranged on the back of the carrier plate, these extensions reach through the carrier plate, wherein at their free ends, signal emitters are attached which cooperate with signal receivers in order to determine the positional change of the free ends of the extensions.

The signal emitters may for example be magnets.

The extensions may be configured integrally with the limbs. However, extension rods are also conceivable which are inserted in the ends of the limbs.

The post is on a pedestal attached to the front side of the carrier plate, wherein the extensions are guided through openings in the pedestal. This allows the signal receivers and a plug for connecting the signal receivers to a signal analysis unit to be arranged on the side of the pedestal facing away from the post.

The signal emitters and signal receivers, and where applicable an analysis electronics, are thus situated on the back of the carrier plate and are physically separated and sealed from the brake shoe region. The heat from the drum which heats up during braking, and abraded brake material, cannot therefore disrupt the signal detection and analysis.

Reference is made initially to FIG. 1 which shows, as well as a first embodiment of the abutment, the outline structure of a drum brake.

Two brake shoes 2, 3 are arranged on the front of a carrier plate 1 which is coupled to an axle carrier. Each brake shoe covers an arc of slightly less than 180° and on its outside carries a brake lining. A brake drum, which is coupled to the rotating axle and not shown here for reasons of clarity, surrounds the two brake shoes, so that on brake application the brake shoe is pressed against the brake drum, whereby the resulting friction forces brake the axle and hence a wheel mounted on the axle.

For brake application, a spreader element 4, which may be designed in widely varying fashion, is arranged on the pressure ends of the brake shoes. This may be a hydraulic cylinder or an electric actuator.

Between the other ends of the brake shoes, namely the abutment ends, an abutment 5 is arranged on the carrier plate 1, and in this exemplary embodiment is configured as a solid anvil made of metal. This has an anvil head 6 which transforms via a stand 7 into a pedestal 8. The stand 7 protrudes through an opening 9 in the carrier plate 1, wherein the pedestal 8 is attached to the back of the carrier plate, i.e. the side facing away from the brake shoes 2, 3.

The two brake shoes 2, 3 are arranged on opposite end faces of the anvil head 6. When the brake is applied, the spreader device 4 is widened so that a corresponding support force is exerted on both end faces of the anvil head 6. The material of the anvil head 6 is hard but nonetheless elastically deformable, so that the forces cause a deformation of the anvil head and a tilting of the stand 7 if the support forces are not equal.

This deformation or tilting is associated with mechanical stresses in the anvil, which can be detected by strain gauges mounted at suitable points on the anvil.

Figure 2:
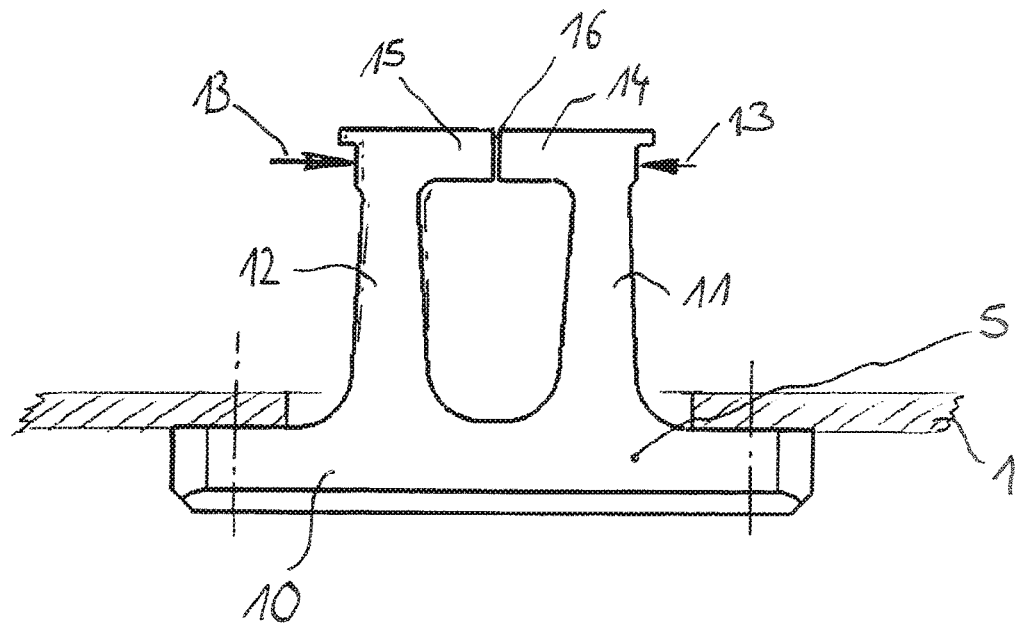
FIG. 2 a second embodiment of the abutment.

A variant of this embodiment is illustrated in FIG. 2. Here, two limbs 11, 12 extend from a base 10, the free ends of which support the abutment ends of the brake shoes (arrows 13). The base 10, like the pedestal 8, is attached to the back of the carrier plate 1, and the limbs 11, 12 protrude through an opening 9 towards the front of the carrier plate 1.

On brake application, the limbs are pressed together. The distance between their free ends can be measured. For this, they have two inwardly oriented protrusions 14, 15, the mutually facing ends of which form a measurement gap 16. The width of the measurement gap 16 represents the deformation of the abutment and thus constitutes a measure of the force exerted on the limbs.

This distance may be measured in various ways. If the protrusions 14, 15 are provided with magnets, their mutual spacing may be detected by a linear Hall sensor or AMR sensor (neither of which is shown here). It would however also be conceivable to surround the gap with a moving coil, the inductance of which changes with the width of the gap so as to form a measure of the deformation of the abutment 5.

Figure 3:
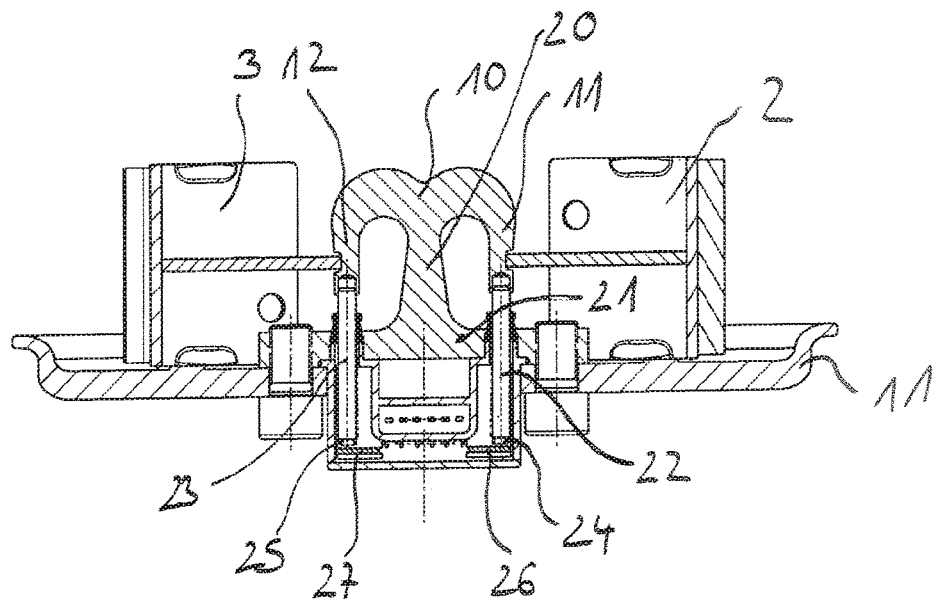
FIG. 3 a third embodiment of the abutment.

FIG. 3 shows a further embodiment of the abutment 5 in which the base 10 is arranged above the carrier plate 1, so that the two limbs 11, 12 point towards the carrier plate 1. To achieve this, a post 20 protruding from a pedestal 21 is situated between the two limbs. In side view, the abutment thus has the form of a stylized ram's head with horns. The limbs 11, 12, the base 10, the post 20 and the pedestal 21 are made of one piece. The pedestal 21 is attached to the front side of the carrier plate 1.

It is conceivable that the pedestal 21 is also bolted (not shown here) directly to the axle body in that corresponding openings are provided on the carrier plate, wherein in some cases the carrier plate is also bolted in the force flow. In this way, the pedestal 21 is connected with great torsional rigidity.

The abutment ends of the two brake shoes are supported on the outsides of the two limbs 11, 12.

In order to be able to measure the distance between the two limbs, the latter have extensions 22, 23 in the form of rods pointing through openings in the pedestal 21 towards the back of the carrier plate 1. A measurement device is situated there. This consists of magnets 24, 25 at the free ends of the rods 22, 23. Sensors sensitive to magnetic fields (e.g. Hall sensors or AMR sensors) are arranged on circuit boards 26, 27 and lie opposite the magnets.

Collars are arranged in the openings of the pedestal 21 in order to seal the rods 22, 23 against the opening. The entire measurement arrangement is thus mounted on the side facing away from the brake device and is therefore protected from the effects of abraded brake material and heat.

The abutment 5 with the measuring device may be preassembled and attached to the carrier plate 1 as one assembly.

Each elastic abutment 5 can be linked to the added value that due to its reversible elasticity, designed in the manner of a force accumulator, it can reduce or prevent, in a mechanical and automatic unpowered fashion, the generation of a destructively large and excessive application force (automatic, unpowered function to limit application force). A further advantage relates to an improvement of a parking brake function under modified peripheral conditions. For example, it is easily possible to provide an automatic application force compensation when for example a brake drum, which was applied when hot, shrinks due to cooling. Under these modified peripheral conditions, conventional drum brakes react disadvantageously with an automatic increase in application force. Conversely, the elastic spring effect of the abutment 5 automatically helps, even after the vehicle is parked in severe cold and when the brake drum later heats up (and expands) when warmed (for example by solar radiation). Under these modified peripheral conditions, conventional drum brakes react disadvantageously with an automatic loss of application force, which can trigger additional cost due to the necessity for additional adjustment processes.

LIST OF REFERENCE SIGNS

1 Carrier plate
2 Brake shoe
3 Brake shoe
4 Spreader device
5 Abutment
6 Anvil head
7 Stand
8 Pedestal
9 Opening
10 Base
11 Limb
12 Limb
13 Arrows
14 Protrusions
15 Protrusions
16 Measurement gap
20 Post
21 Pedestal
22 Extensions
23 Extensions
24 Magnets 25 Magnets
26 Circuit board
27 Circuit board

The invention claimed is:

1. A drum brake comprising:
a brake drum and two brake shoes which can be applied to the brake drum and are attached on the brake shoe side of a carrier plate;
each of the brake shoes have a pressure end and an abutment end, wherein a spreader device is arranged between the pressure ends;
an abutment with a load measuring device is provided between the abutment ends, wherein the load measuring device serves to determine a load prevailing at the abutment;
wherein the abutment as a whole is a solid component which elastically deforms under load, to provide automatic unpowered force limitation of the deformation of the abutment; and
at least one sensor which detect the deformation of the abutment occurring under load.

2. The drum brake as claimed in claim 1, wherein the abutment has a form of an anvil, wherein the abutment ends lie at opposite ends of the anvil head.

3. The drum brake as claimed in claim 2, wherein the at least one sensor is a strain gauge to detect deformation of the anvil.

4. The drum brake as claimed in claim 1, wherein the abutment has a U-shape with a base and two limbs, the outsides of which support the abutment ends, and wherein the at least one sensor detects slope of the limbs which changes under load.

5. The drum brake as claimed in claim 4, wherein the wherein the at least one sensor detects distance between free ends of the limbs.

6. The drum brake as claimed in claim 5, wherein the limbs have extensions.

7. The drum brake as claimed in claim 5, wherein the base is attached to the outside of the carrier plate and the limbs protrude through an opening in the carrier plate on the brake shoe side where the abutment ends are supported.

8. The drum brake as claimed in claim 5, wherein the abutment is carried by a post attached to the carrier plate and adjoining the inside of the base so that the limbs are oriented towards the carrier plate.

9. The drum brake as claimed in claim 4, wherein free ends of the limbs have inwardly oriented protrusions, and wherein end faces of the free ends are separated from each other by a measurement gap.

10. The drum brake as claimed in claim 9, wherein the base is attached to the outside of the carrier plate and the limbs protrude through an opening in the carrier plate on the brake shoe side where the abutment ends are supported.

11. The drum brake as claimed in claim 9, wherein the abutment is carried by a post attached to the carrier plate and adjoining the inside of the base so that the limbs are oriented towards the carrier plate.

12. The drum brake as claimed in claim 4, wherein the base is attached to the outside of the carrier plate and the limbs protrude through an opening in the carrier plate on the brake shoe side where the abutment ends are supported.

13. The drum brake as claimed in claim 4, wherein the abutment is carried by a post attached to the carrier plate and adjoining an inside of the base so that the limbs are oriented towards the carrier plate.

14. The drum brake as claimed in claim 13, wherein the post is configured integrally with the abutment.

15. A drum brake comprising:
a brake drum and two brake shoes which can be applied to the brake drum and are attached on the brake shoe side of a carrier plate, wherein each of the brake shoes have a pressure end and an abutment end;
a spreader device arranged between the pressure ends of the brake shoes;
an abutment, wherein the abutment is a solid component which can be deformed elastically under load, and has a U-shape with a base and two limbs, the outsides of which support the abutment ends;
a load measuring device is provided between the abutment ends, wherein the load measuring device determines a load prevailing at the abutment;
at least one sensor which detects a distance between free ends of the limbs and slope of the limbs, which changes under load to detect the deformation of the abutment occurring under load;
wherein the limbs have extensions and wherein the extensions reach through the carrier plate and have free ends; and
signal emitters are attached to the free ends of the extensions, which cooperate with signal receivers to determine positional change of the free ends.

16. The drum brake as claimed in claim 15, wherein the signal emitters are magnets.

17. The drum brake as claimed in claim 15, wherein the post is configured integrally with a pedestal which is attached to the inside of the carrier plate, wherein the extensions are guided through openings in the pedestal, and wherein the signal receivers and a plug for connecting the signal receivers to a signal analysis unit are arranged on the side of the pedestal facing away from the posts.

* * * * *